United States Patent Office 2,976,147

Patented Mar. 21, 1961

2,976,147

PHOTOGRAPHIC STRIPPING FILM

Francis Peter Alles, Westfield, N.J., assignor to E. I. du Pont de Nemours and Company, Wilmington, Del., a corporation of Delaware No Drawing. Filed Aug. 7, 1958, Ser. No. 753,630

3 Claims. (Cl. 96—83)

This invention relates to the art of photography and more particularly to photographic stripping films for the graphic arts. More particularly it relates to such films which are presensitized and suitable for use in making gelatin reliefs for photogravure and like reproduction processes. Still more particularly this invention relates to gravure resists useful in making intaglio printing elements and the preparation of such elements.

In the photogravure process it has been the custom to use so-called "carbon tissues" which consist of a pigmented gelatin coating on paper. This material has no inherent sensitivity to light and hence must be sensitized by the user in a bichromate solution. The bichromated gelatin system has various disadvantages which are well known to those skilled in the art including long exposures to light because of their low sensitivity and a limited scale of tones. Another disadvantage is that of poor dimensional stability.

In more recent developments, it has been proposed to overcome some of the disadvantages of the "carbon tissues" by using a gelatino silver halide emulsion coated on a water-insoluble protective or so-called permanent film which in turn is attached to a temporary film or paper base by means of a stripping layer. Such stripping elements are disclosed, for example, in Boyer U.S. Patent 2,650,877 and Boyer et al. U.S. Patent 2,650,878.

Stripping films of this type offer considerable advantages, such as in time saving, over the "carbon tissues," but also have some attendant disadvantages. For example, after such a stripping element is exposed, developed, adhered to the printing member with the image layer face down, and the temporary support stripped from the film element, it then becomes necessary to remove the water-insoluble protective or so-called permanent support with a special solvent. The solvent does not always completely remove this supporting layer and several difficulties result from this inadequate removal. For example, the usual warm water treatment will not form a good quality gelatin relief image and consequently a poorly etched plate will be the final result of the procedure.

An object of this invention is to provide an improved presensitized photographic stripping film for making gelatin relief images. A further object is to provide such a film which can be used in the photogravure process in place of the "carbon tissues" and the disadvantageous presensitized films described in the preceding paragraph. A still further object is to provide such a film having proper stripping properties. A preferred embodiment of this invention has for its particular object the provision of a photographic stripping film having excellent relief characteristics and outstanding dimensional stability. Still other objects will be apparent from the following description of the stripping film.

The presensitized stripping film of this invention comprises a hydrophobic film base having a surface coating, or substratum, of a thin layer of a water-permeable colloid, e.g., albumin, agar-agar, or preferably gelatin, on which is coated a stripping layer of critical and novel content as hereinafter described, which in turn is coated with a gelatino silver halide emulsion layer.

The stripping layer, which I have found to be uniquely advantageous, is composed of an aqueous composition having two essential ingredients: (1) gelatin, and (2) a water-soluble N-vinyllactam polymer containing 4 to 5 carbon atoms in the heterocyclic ring. The polymers can be homopolymers or copolymers of vinyl compounds or of vinylidene compounds, wherein the copolymers contain at least 80% by weight of N-vinyllactam.

It is important that these two essential ingredients (1) and (2) be present in the composition in a ratio by weight of from 1 to 15, and preferably 3 to 15 parts of gelatin for each part of the water-soluble polymer. More than one of these polymers can of course be used in the same stripping layer composition, as long as the total amount of the polymer does not exceed the 1 part for each part of gelatin present.

Particularly outstanding characteristics of lack of brittleness, ease in wet handling, and satisfactory strippability are obtained according to this invention by the use of polyvinyl pyrrolidone as the water-soluble polymer.

The gelatin in the critical stripping layer composition according to this invention is so selected that it is a gel at normal photographic processing temperatures, i.e., on the order of 20° C. The water-soluble polymer preferably has a relatively low viscosity, such as on the order of 2–30 centipoises for a 4% aqueous solution at 20° C. The concentration of the stripping layer material at coating is preferably approximately 5 to 7% by weight.

The polymer is characterized by preventing migration of the polymer from the stripping layer, or loss by leaching during photographic processing. By being water-soluble and non-migratory, the polymer controllably reduces the cohesive strength of the gelatin and hence the gel strength of the stripping layer at low water concentrations and elevated temperature. The polymer preferably has an average molecular weight of greater than about 20,000.

Generally, then, the water-soluble polymer will be miscible with gelatin and will not precipitate gelatin from an aqueous mixture therewith. The polymer should not, of course, have any detrimental photographic activity such as causing fog in a light sensitive gelatino silver halide emulsion. The preferred gelatin and polyvinyl pyrrolidone composition has proven particularly advantageous in its lack of deleterious photographic effects. The water solubility of the polymer should range from about 4% to about 40% by weight.

Illustrative of the water-soluble N-vinyllactam polymers within the scope of this invention can be mentioned poly-N-vinyl-2-pyrrolidone, poly-N-vinyl-2-piperidone, poly(N-vinyl-2-pyrrolidone/N-vinyl-epsiloncaprolactam), poly-N-vinyloxazolidone, poly-N-vinylvalerolactam, and poly-N-vinyl-5-methyl-2-pyrrolidone and copolymers of two or more of the corresponding monomers. Also, copolymers of the latter can be used with a vinylidene monomer containing a single carbon to carbon unsaturation such as vinyl salicylate, vinyl acetate, vinyl alcohol, methyl acrylate, acrylamide, methacrylamide, acrylonitrile, vinyl chloride, vinylidene chloride and styrene containing at least 80% by weight of the poly-N-vinyllactam.

The suitable water-soluble N-vinyllactam polymers and methods for their preparation are known. For example, the preparation of polyvinyl piperidone is described by Longley, Emerson and Shafer in J.A.S.C. 74, 2012–15 (1952). The preparation of polyvinyl oxazolidone is described in J. Org. Chem. 22, 849 (1957). The preparation of polyvinyl caprolactam is described by Shostakovskii, Medzykovskaya and Zelenskaya in Izvest. Akad. Nauk. S.S.S.R. Otdel. Khim, Nauk. 1952, 682–9.

The thickness of the stripping layer of this invention can vary according to the conditions of intended use and the nature of the effect desired, as will be understood in the art. Generally, the thickness has been found particularly satisfactory within the range from 0.06 mil to 0.35 mil. A particularly preferred average thickness is 0.2 mil.

The photographic stripping film of this invention can be made using conventional photographic film manufacturing equipment and techniques. In order to take full advantage of the novel stripping layers of this invention, it is preferable to coat the silver halide emulsion over the stripping layer, after the stripping layer has been dried. It is also preferable to coat the silver halide emulsion onto the stripping layer at the lowest practical temperature, i.e., about 32–34° C. in order to keep the intermixing of the stripping layer and the emulsion layer at a minimum.

The hydrophobic film base useful in the stripping film of this invention may be composed of such well known film-forming materials as cellulose derivatives, e.g., cellulose nitrate, cellulose triacetate, cellulose acetate, cellulose propionate, cellulose acetate butyrate; polyvinyl chloride, polyvinyl chloride/acetate; polyvinyl acetals, e.g., from formaldehyde and acetaldehyde; super polyesters from dicarboxylic acid and dihydric alcohols, e.g., oriented sheets of polyethylene terephthalate having melting points above 200° C. The latter is the preferred film base material because of its strength and particularly because of the outstanding advantages imparted to the stripping film due to its dimensional stability. The preferred film base can, and preferably does, have a surface coating of a copolymer of vinylidene chloride/acrylonitrile/itaconic acid of the type disclosed in Alles et al. U.S. Patent 2,627,088 and Alles U.S. Patent 2,779,684.

The light sensitive gelatino silver halide emulsion layer should be relatively soft and not contain any of the conventional photographic hardeners, i.e., capable of being later differentially hardened in a developing or bleaching bath so that a relief image can be formed by washing away unhardened emulsion. In addition, the ratio of gelatin to silver halide is preferably high, i.e., a relatively large quantity of gelatin to a relatively small quantity of silver halide. A satisfactory range is from 2 to 5 parts of gelatin to one part of silver halide.

The films can have other layers, as will be understood, such as filter layers, antihalation layers, etc.

Various types of dyes and/or pigments can be used in the emulsion layer, but they should preferably be of a color which will contrast with the reflectance from the metal surface of the plate or cylinder member to which the gelatin emulsion layer is attached in making a gelatin "resist." The surface is usually brightly polished copper and the dye or pigment may be yellow, orange, orange-red, brown, etc. The coloring matter serves as a visual aid to staging and etching operators when there is sufficient contrast to outline details of the relief images.

Various photographic sensitizing dyes can be added to the photographic emulsion if desired to extend the sensitivity in the spectrum. There are a large number of such dyes known and available and they include the simple cyanine, carbocyanine, psuedocyanine, kryptocyanine, merocyanine, and styryl dyes, etc.

The present invention will be further illustrated and explained but is not intended to be limited by the following examples, wherein the parts and percentages indicated are by weight unless otherwise indicated.

*Example 1*

An aqueous gelatin solution was prepared which gave a viscosity of 4.7 centistokes at 60° C. using a 6⅔% solution. The solution was prepared using the following ingredients:

| | | |
|---|---|---|
| Gelatin | grams | 70 |
| 20% KCl | ml | 2 |
| 5% saponin | ml | 16 |
| Ethyl alcohol | ml | 32 |
| 13% thymol | ml | 2 |
| 43% glycerine | ml | 4.5 |
| Water | ml | 1400 |

To two 100 ml. portions of the above solution there were added, respectively, 3 and 6 ml. of a 20% aqueous solution of polyvinyl pyrrolidone that had a kinematic viscosity at 25° C. of about 35 centistokes using an Ostwald-Finske viscosimeter.

Each of the above solutions was coated at 31° C. onto 4 mil thick polyethylene terephthalate film supports made according to Example 1 of Alles et al. U.S. Patent 2,627,088 and dried at room temperature. The coating weight of the resulting layers was about 70 mg./dm.$^2$. On each of these two coated films there was coated at 31° C. an orthochromatically sensitized gelatino silver chlorobromide emulsion containing 25 mole percent of silver chloride. The coating weight of the resulting emulsion layer was about 62 mg. of silver halide per square decimeter. The emulsion coating was also dried at room temperature and the dry anchorage of the layers was found to be satisfactory.

The samples were given a flash exposure to light and processed as follows.

(1) Immersion for 3 minutes at 20° C. in a solution of the following composition:

| | | |
|---|---|---|
| Sodium metabisulfite | grams | 5 |
| Sodium sulfite | do | 10 |
| Metol | do | 1 |
| Hydroquinone | do | 2 |
| Pyrogallol | do | 6 |
| Potassium bromide | do | 3 |
| Anionic wetting agent (Eumercin NB 10% aqueous) | ml | 2 |
| Water to make 1000 ml. | | |

(2) Immersion for 2 minutes at 20° C. in a solution of the following composition:

| | | |
|---|---|---|
| Sodium carbonate (monohydrate) | grams | 100 |
| Anionic wetting agent (Eumercin NB 10% aqueous) | ml | 2 |
| Water to make 1000 ml. | | |

(3) Wash 1 minute in water at 20° C.

(4) Fix for 3 minutes at 20° C. in a solution having the following composition:

| | Grams |
|---|---|
| Sodium thiosulfate | 200 |
| Boric acid | 15 |
| Water to make 1000 ml. | |

(5) Wash for 10 minutes in water at 20° C.

The two samples were dried and layed emulsion side down on clean water-wet copper plates at a speed of about 40 inches per minute. The plates with the films attached were immersed in water at 48° C. for 1 minute at which time the film support of each was easily separated from the emulsion layer. The copper plates were then immersed in water at 125° F. for 10 minutes to dissolve away all unexposed unhardened gelatin, thus forming a relief image of varying thickness of hardened gelatin on the copper, in relation to the silver densities. After thoroughly drying the gelatin relief image and covering over the bare areas of copper with asphaltum as is common practice in the art, the relief images were etched into the copper. Normal gravure etching procedure was used, by employing conventional ferric chloride etching solutions. Satisfactory etching was obtained, resulting in printing plates that produced prints of good quality.

*Example 2*

Example 1 was repeated that 1.5, 3, 4.5 and 6 ml. respectively of the 20% polyvinyl pyrrolidone solution were added to four 100 ml. portions of the gelatin solution of Example 1. Stripping of the support from the emulsion layer after lay-down at 40 inches per minute on the wetted copper plate was satisfactory in all cases. Slight frilling occurred in processing the sample which contained the 6 ml. amount of polyvinyl pyrrolidone.

*Example 3*

Four samples of the film base of Example 1 were coated with a stripping layer having the following composition:

| | | |
|---|---|---|
| Gelatin | grams | 560 |
| KCl, 20.3% | ml | 16 |
| Saponin, 35% in alcohol | ml | 92 |
| Glycerine, 43.6% | ml | 37 |
| Alcohol | grams | 185 |
| Water | ml | 185 |
| Thymol, 13.5% | ml | 2 |
| Polyvinyl pyrrolidone, 40% solution (kinematic viscosity of a 20% solution at 25° C. was 25 centistokes | g | 170 |

Water added to make a 5.5% gelatin solution.

The solution was coated onto the base at 35° C. to obtain a dry coating weight of 77 mg./dm.$^2$. The gelatino silver halide emulsion of Example 1 was coated over the dried stripping layer in an amount to give a coating weight of 46 mg./dec.$^2$. An antihalation layer was applied to the opposite surface of the support.

No frilling was observed when the exposed samples were processed as described in Example 1. When the processed elements were adhered emulsion surface down on copper plates the support was easily stripped from the emulsion layer after immersion in water at 49° C. for 1 minute. The samples were layed down on the copper at speeds respectively of 22, 44, 69 and 88 inches per minute. The samples layed down at speeds of 22 and 44 inches per minute separated quite easily from the film support. The samples layed down at speeds of 66 and 88 inches per minute were slightly harder to strip.

*Example 4*

Example 3 was repeated using 238 grams of a 40% solution of polyvinyl pyrrolidone instead of 170 grams. Stripping was satisfactory in all cases.

*Example 5*

A film support such as that described in Example 1 was coated with a solution of the following composition:

| | | |
|---|---|---|
| Gelatin | grams | 6720 |
| KCl, 20.3% | ml | 193 |
| Saponin, 5% in 35% alcohol | ml | 1110 |
| Thymol, 13.5% | ml | 148 |
| Alcohol | ml | 2220 |
| Water | ml | 107040 |
| Polyvinyl pyrrolidone 40% (viscosity of 20% sol. at 25° C. was 25 centistokes) | grams | 3750 |

The pH of the solution was adjusted to 6.0±.2 before coating. The coating weight was about 74.8 mg./dm.$^2$. The dried stripping layer was overcoated with the silver halide emulsion described in Example 1 to give a coating weight of 63 mg./dm.$^2$. An anti-halation layer was applied on the opposite surface of the support.

When the above element was exposed, processed and applied emulsion surface down to a copper plate at a speed of 22 inches per minute, the film base support was easily separated from the emulsion layer when the plate was immersed in water at 49° C.

The above examples are intended not to be limitative of this invention, and these and other examples can of course be carried out, in the practice of this invention by persons skilled in the art, by merely substituting other water-soluble polymers referred to above for those in the examples on an equal weight basis, to obtain similarly satisfactory results. Likewise, although only gelatin silver chlorobromide emulsions have been used in the examples, it will be obvious that other photographic silver halide emulsions can be used, such as silver chloride, silver bromide, silver iodobromide, etc.

An advantage of the films is that they are commercially practical and can be made with conventional coating equipment of photographic manufacturers. Another advantage is that the stripping layer has adequate adhesion when dry in the form of raw stock, or wet during processing. A further advantage is that the stripping layer allows the support to be readily stripped from the emulsion after lay-down on a water-wetted copper printing element and the temperature is raised by immersion of the element in water having a temperature of about 45° to 60° C. A particular advantage of the preferred embodiment of the stripping film according to this invention wherein the support is polyethylene terephthalate is its dimensional stability. A still further advantage is that the films of this invention can reproduce a wide range of tones. Still other advantages will be apparent from the above description of the invention.

What is claimed is:

1. A photographic stripping film comprising a hydrophobic film base having on one surface coated in order with a water-permeable colloid layer, a stripping layer comprising an aqueous composition having as essential ingredients (1) gelatin and (2) a water soluble polymer of at least 80% N-vinyllactam units selected from the group consisting of N-vinyl-2-pyrrolidone, N-vinyl-2-piperidone, N - vinyl-2-pyrrolidone/N-vinyl-epsilon-caprolactam, N-vinyloxazolidone, N-vinylvalerolactam, and N-vinyl-5-methyl-2-pyrrolidone, the balance of the polymeric units consisting of units of a vinylidene monomer containing a single carbon to carbon unsaturation, said ingredients being present in said composition in a ratio of from 3 to 15 parts by weight of gelatin for each part of ingredient (2), and a gelatino silver halide emulsion layer; said polymer being soluble from about 4% to about 40% in water.

2. A photographic stripping film as set forth in claim 1 wherein said film base is polyethylene terephthalate.

3. A photographic stripping film comprising a hydrophobic film base having one surface coated in order with a thin layer of gelatin, a stripping layer composed of an aqueous composition having as essential ingredients gelatin and a water-soluble polyvinyl pyrrolidone, said gelatin in said stripping layer being present in a ratio of from 3 to 15 parts by weight per part of polyvinyl pyrrolidone, and a gelatino silver halide emulsion layer; said polymer being soluble from about 4% to about 40% in water.

References Cited in the file of this patent

UNITED STATES PATENTS 2,626,858 McGraw et al. ---------- Jan. 27, 1953

FOREIGN PATENTS 687,751 Great Britain ---------- Feb. 18, 1953